M. L. PORTER.
ORE CONCENTRATOR.
APPLICATION FILED MAY 12, 1913.
1,073,928.
Patented Sept. 23, 1913.
3 SHEETS—SHEET 1.
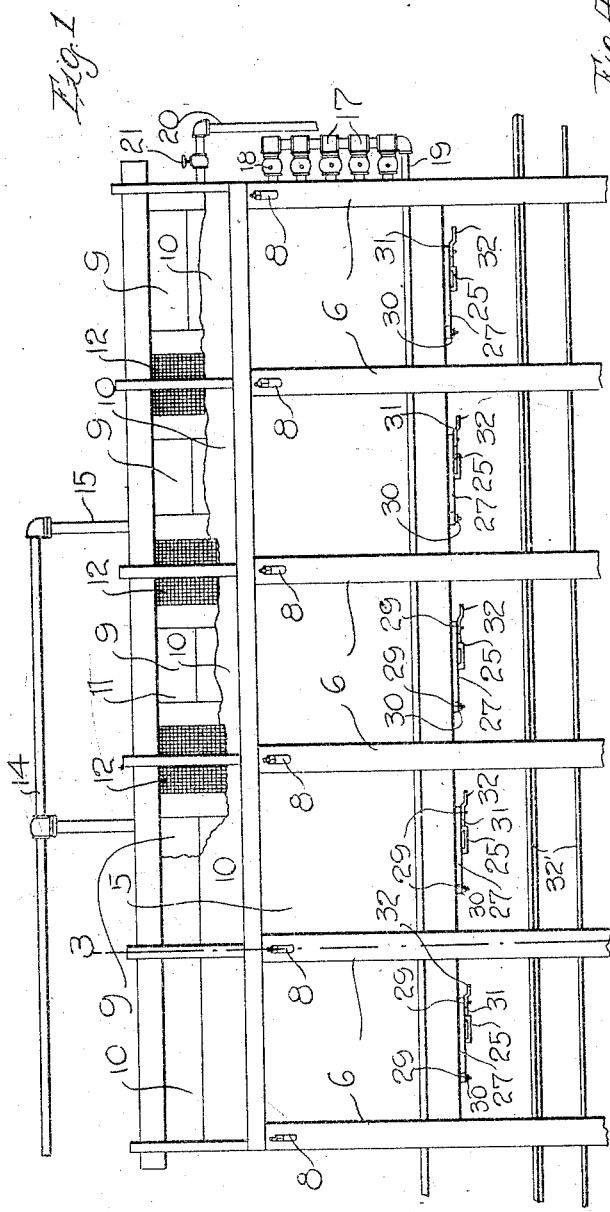
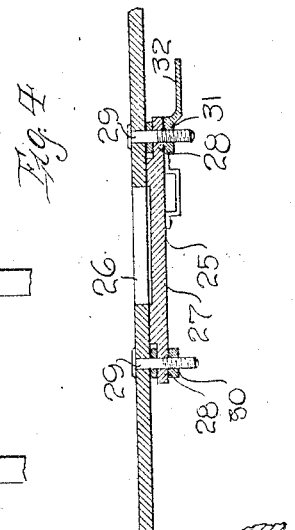
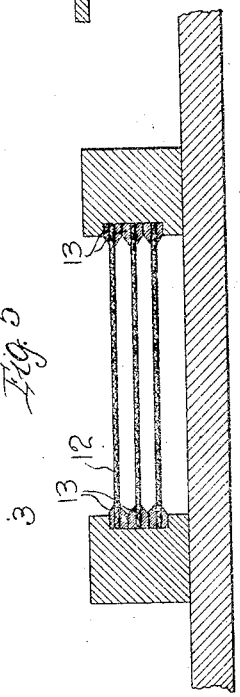
Witnesses
Robert M. Sutphen
A. J. Hind
Inventor
M. L. Porter
By Watson E. Coleman
Attorney

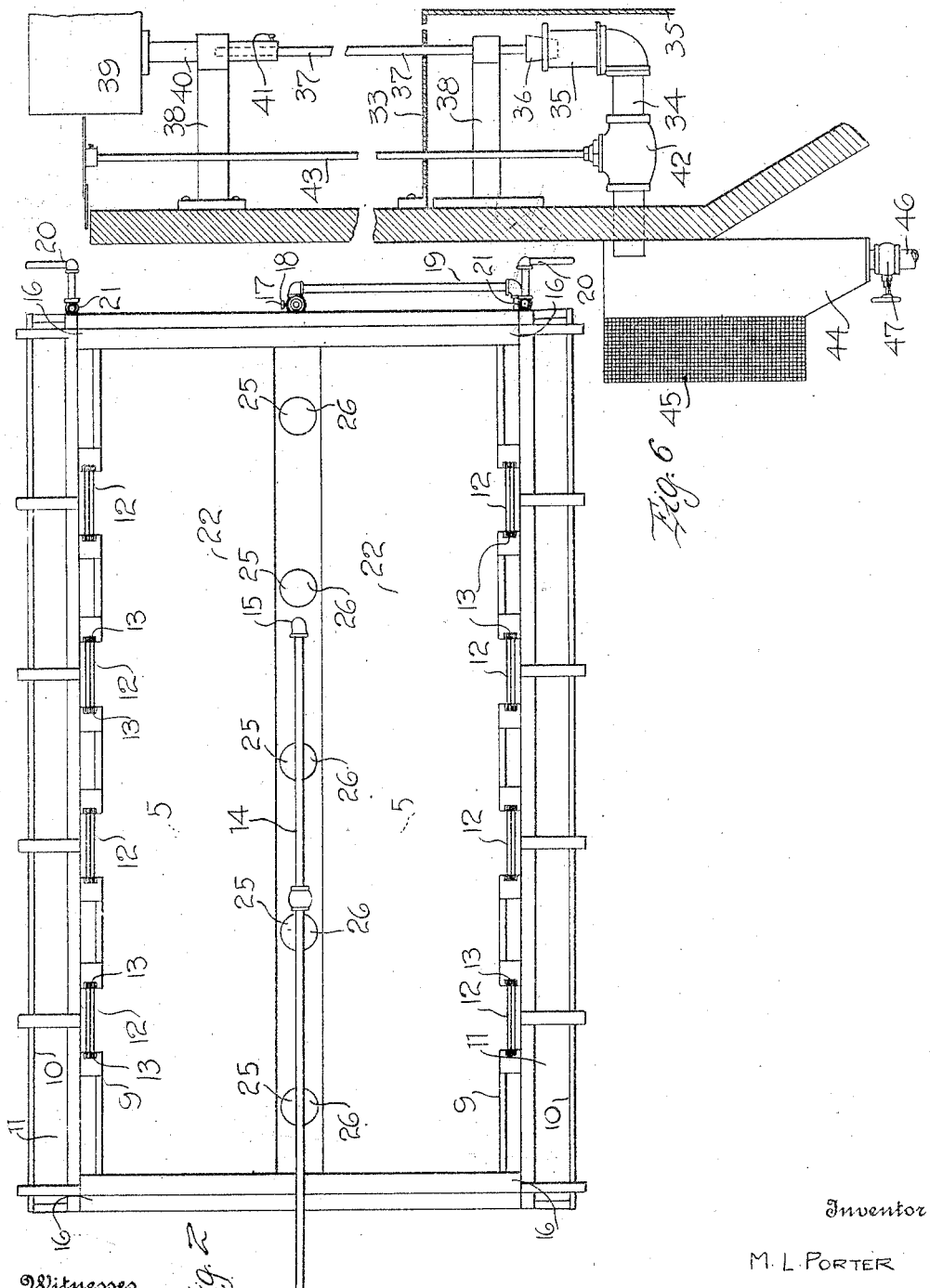

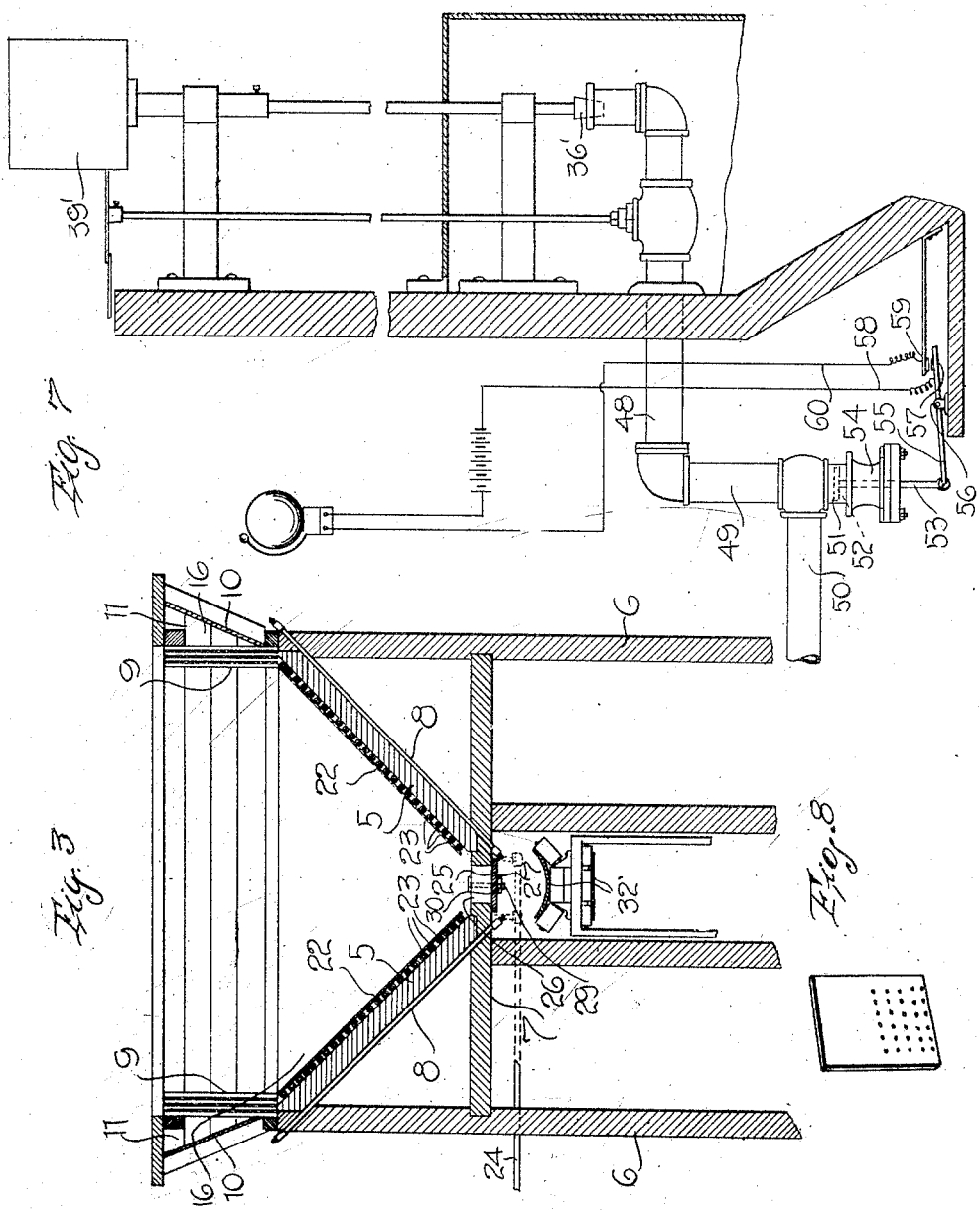

UNITED STATES PATENT OFFICE.

MARION L. PORTER, OF SILVERTON, COLORADO.

ORE-CONCENTRATOR.

1,073,928. Specification of Letters Patent. Patented Sept. 23, 1913.

Application filed May 12, 1913. Serial No. 767,176.

*To all whom it may concern:*

Be it known that I, MARION L. PORTER, a citizen of the United States, residing at Silverton, in the county of San Juan and State of Colorado, have invented certain new and useful Improvements in Ore-Concentrators, of which the following is a specification, reference being had to the accompanying drawings.

This invention relates to machines for recovering minerals which are too fine to be precipitated and separated from foreign material by passing the same through the ordinary appliances now in use in quartz mills, and has for its primary object to produce a machine for the above purpose which is simple and inexpensive in its construction and will effectually perform the functions for which it is devised.

The invention has for another object, the provision of a machine for settling the slimes carried in suspension in the water which have passed through a concentrating mill, said machine embodying a receiving tank or hopper, collecting plates therein for the finely comminuted minerals and means for drying out the minerals whereby the same may be easily collected.

The invention has for another object the provision of a plurality of series of screens arranged above the tank or hopper at each side thereof, through which the water may pass into collecting chambers to which waste pipes are connected, the screens of each series being independently movable.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a side elevation partly broken away of a machine embodying the present invention; Fig. 2 is a top plan view thereof; Fig. 3 is a section taken on the line 3—3 of Fig. 1; Fig. 4 is an enlarged detail section through the bottom wall of the tank or hopper showing the construction of the gates; Fig. 5 is an enlarged detail section illustrating the mounting of the filtering screens; Fig. 6 is a detail elevation, one of the side walls of the tank being in section showing a slightly modified construction of the filter; Fig. 7 is a similar view illustrating an automatic alarm device which is designed for use in connection with the filtering tank. Fig. 8 is a detail view of the inner filtering member.

Referring in detail to the drawings, 5 designates the convergently inclined side walls of a tank or hopper which are supported at intervals by the spaced standards or uprights 6, the corresponding standards on opposite sides of the hopper being connected by transverse bars 7 to which the lower edges of the side walls 5 are secured. Obliquely inclined truss rods 8 connect these standards 6 and the cross bars 7, said rods being arranged exteriorly of the tank or hopper and adjacent the side walls 5 thereof. At the upper ends of the side walls 5, the vertical walls 9 are arranged to form an extension of the hopper. To the side walls 9, the lower edges of the outwardly inclined walls 10 are secured, and these walls form longitudinally extending chambers 11.

In the longitudinal walls 9 of the machine, a plurality of series of filtering screens indicated at 12 are arranged. Three filtering plates or screens are preferably employed in each series though it will be understood that a greater number may be used, if desired. These screens are mounted for vertical sliding movement in the guides 13 and may be independently removed when it becomes necessary to clean or repair the same. The innermost filtering screen 12 at its upper portion is formed of imperforate material while the lower portion thereof is provided with extremely fine perforations. The intermediate screen 12 has slightly larger perforations, while the outermost perforated screen is comparatively coarse. These filtering members may be constructed of woven wire or may be in the form of perforated plates.

14 designates the feed line pipe which supplies the mineral impregnated slime to the tank or hopper of the machine, said pipe being provided with spaced outlet or discharge pipes 15 arranged at opposite sides of the center of the machine. The inclined side walls 5 of the tank are of course, connected at their ends by the end walls 16 and to one of these end walls, a series of outlet pipes 17 are connected, each of said pipes having a valve 18. These outlet pipes are connected to a common discharge pipe 19, through which the water is discharged from the machine. To one end of each of the water receiving chambers 11, a waste pipe 20 is connected, said pipe having a suitable valve 21. By means of these waste pipes, the water in the chambers 11 is drained therefrom.

The inclined mineral collecting plates 22 are arranged in spaced parallel relation to the upper surfaces of the side walls 5 of the tank or hopper and between these plates and the hopper walls, the pipe coils 23 are arranged. These coils at one of their ends are connected to a common steam supply pipe 24 which extends beneath the bottom of the tank or hopper, the other end of said coils returning to the source of steam supply or to the coils of a second machine, when the same are employed in series. In the bottom of the tank or hopper, between the side walls 5 thereof, the gates indicated at 25 are arranged. Any desired number of these gates may be employed, the same being disposed beneath the openings 26 in the bottom of the hopper, and they each include a plate or disk 27 having apertured ears 28 through which the bolts 29 extend. Nuts 30 and 31 are threaded upon the respective bolts 29, the nut 31 serving to securely clamp the gate plate in its closed position. This plate is provided with a suitable hand-hold 32. In order to open the gate to permit of the escape of the concentrates from the machine, the nut 30 is removed and the nut 31 loosened whereby the gate may be readily swung to its open position. A longitudinally extending conveyer 32' of any suitable construction is centrally arranged beneath the tank or hopper and receives the concentrates therefrom.

It is a well known fact that after all of the heavier particles have been precipitated by the use of various concentrating devices, the slime still contains considerable finely comminuted mineral which is so light that it cannot be precipitated and collected by the ordinary appliances now in common use. This fine light material will readily float in water and is carried in suspension thereby. Heretofore, these extremely fine mineral particles have been lost and it is the purpose of the present invention to recover the very lightest and finest mineral particles which are frequently almost invisible. To this end, the mineral impregnated slime is fed to the tank or hopper until the level thereof rises above the inclined hopper walls and between the walls 9 arranged above the same. As the only outlets from the tank are through the filtering members 12, the finely comminuted mineral collects upon the inner surface of the innermost filtering member, those extremely fine particles which are invisible collecting upon the imperforate upper portion of said filtering member.

The water passes through these several members and into the longitudinal collecting chambers 11 from which it is discharged by the waste pipes 20. After the water has been permitted to run into the tank for a predetermined length of time so that a desired quantity of the mineral will be collected, the supply is turned off and the water in the tank permitted to drain therefrom by opening the several valves 18. The height of the water in the tank is slowly lowered by providing the plurality of outlets 17, thus giving the fine mineral particles time to settle upon the collecting plates 22. After the water has been withdrawn from the tank, steam is turned into the pipe coils 23. These steam coils highly heat the plates 22 thus drying the concentrates which have settled thereon. These dried mineral particles gravitate downwardly upon the inclined plates 22 into the trough at the base thereof and are collected by opening the several gates 25 thereby permitting the same to fall upon the conveyer 32' which conveys the same to suitable storage bins.

My improved concentrating machine above described is adapted to be used in series, the mineral impregnated slime being fed to one machine to permit the mineral to collect therein while the mineral particles are being dried and emptied from the tank of the other machine. By providing the series of outlets 17, operations may be greatly expedited as a partially filled tank may be unloaded and the partially concentrated slime withdrawn therefrom and conveyed through the pipe 19 to the tank of the adjacent machine.

In Fig. 6 of the drawings, I have shown a slightly modified construction of the filters which are arranged upon the tank walls and an automatically actuated valve for releasing the mineral impregnated water and slime so that the same will pass from the tank through the filters. In this modified construction, I provide a hood or deflecting plate 33 which is secured at one of its edges to the inner face of the side wall of the tank and extends laterally therefrom, the inner portion of said deflecting plate being downwardly extended at right angles to the remaining portion thereof. This plate provides a hood or housing for a pipe 34 which extends through the side wall of the tank and prevents the mineral deposits from accumulating in the vertically disposed entrance nipple 35 of said pipe. This nipple is provided with a suitable valve seat for engagement by the valve member 36 which is secured to the lower end of a vertically movable rod 37 mounted in suitable guide brackets 38 arranged upon the tank wall. 39 indicates a float provided with a tubular stem 40 which is movable in one of the brackets 38, the upper end of the rod 37 being adjustably secured in said stem by means of the set screw 41. In the pipe 34, a valve 42 is arranged, said valve being opened and closed by means of the rod 43 which extends upwardly above the upper edge of the tank. The filter box or chamber 44 is mounted upon the outer face of the tank wall and is provided upon one side with a wall of reticulated material as indicated at 45 which provides a suitable filtering medium. To the lower end of the filtering box 44, a pipe 46 leading to a storage tank or reservoir is connected, said pipe being provided with a valve 47 through which the mineral which may be collected in the filter box is withdrawn and returned to the main tank to be again treated.

The operation of the above described form of the filter will be readily understood. As the mineral impregnated slime and water is fed to the tank of the concentrator, it rises above the hood or deflector plate 33, and elevates the float 39, thereby lifting the rod 37 and moving the valve 36 from its seat in the upper end of the pipe nipple 35. The water in the tank will thus drain off through the pipe 34 into the filtering box 44 and pass through the filtering wall 45 thereof while the concentrates which may be contained therein will be caught and retained in the box until drawn off from the pipe 46. It will thus be seen that the water and slime is at all times maintained at the same level in the tank of the concentrator. The withdrawal of the water from the tank may be cut off at any time by closing the valve 42 in order to allow the concentrates to settle upon the amalgam plates, arranged on the lower converging tank walls.

In Fig. 7, I have shown an alarm device which I have designed for use in connection with the filter tank. This device embodies in its construction, a pipe 48 the inner open end of which is normally closed by a valve 36' similar to the valve 36 above referred to and operated by a float 39'. This float, however, is disposed above the normal level of the float 39, so that the water will not elevate the same when the valve 36 is opened. Thus the valve 36' will remain closed and there will be no outlet of the fluid from the tank through the pipe 48. A depending pipe 49 is coupled to the outer end of the pipe 48 and a pipe 50 connected to said latter pipe extends to the storage tank or reservoir. A T-coupling connects the pipes 49 and 50 and to the same, a nipple 51 is connected in which the plunger 52 is movably disposed, the plunger rod 53 extending through a suitable stuffing box 54 and is pivotally connected at its lower end to the lever 55. This lever is fulcrumed intermediate of its ends as at 56 upon a bracket or other suitable support and is provided with a contact plate 57 to which one of the wires 58 of the electric circuit of a bell or other alarm device is connected. 59 designates the stationary contact member to which the other circuit wire 60 is connected. From this construction, it will be apparent that if anything interferes with the proper operation of the float 39 so that the valve 36 is not moved from its seat to open the entrance to the pipe 34, and the water and slime in the tank is in imminent danger of overflowing, the continued rise thereof will elevate the float 39', thereby unseating the valve 36' and permitting the water in the tank to drain off through the pipe 48. The pressure of this water upon the plunger 51 will force the rod 53 downwardly, thereby oscillating the lever 56 and engaging the contact plate 57 with the stationary contact 59. Thus the electric circuit is closed and the bell or other alarm device actuated, to warn the operator who promptly shuts off further supply of the water and slime to the concentrating tank.

From the foregoing, it is believed that the construction and manner of operation of my improved ore concentrator will be clearly and fully understood. It will be obvious that by employing the series of filtering members 12, even the very finest mineral particles may be saved. It will of course be understood that the principle of the invention may be successfully carried out without necessarily adhering to the specific construction of the machine as disclosed in the accompanying drawing, as such construction is susceptible of considerable modification in the form, proportion and arrangement of the several elements employed, without departing from the essential features or sacrificing any of the advantages of the invention.

Having thus described the invention, what is claimed is:

1. In an ore concentrator, a receiving tank for the mineral impregnated liquid, collecting plates for the mineral particles arranged in the tank, a discharge pipe connected to the tank to withdraw the water therefrom, and means for heating said plates to dry the concentrates.

2. In an ore concentrator, a tank to receive the mineral impregnated liquid, mineral collecting plates arranged in said tank in spaced relation to the side walls thereof, a discharge pipe connected to the tank to withdraw the liquid therefrom, and heating pipes arranged between said plates and the tank walls to heat the plates and dry out the concentrates.

3. In an ore concentrator, a receiving tank for the mineral impregnated liquid, mineral collecting plates arranged in said tank, a discharge pipe connected to the tank to withdraw the liquid therefrom, and steam pipe coils contiguously related to said plates to heat the same and dry out the concentrates.

4. In an ore concentrator, a tank to receive the mineral impregnated liquid, said tank having convergently disposed side walls and outlet openings in its bottom between said side walls, a discharge pipe connected to the tank to withdraw the liquid therefrom, and means arranged between the inclined walls of the tank and said plates to heat the plates and dry out the concentrates whereby the same will gravitate downwardly to the openings in the bottom of the tank.

5. In an ore concentrator, a tank to receive the mineral impregnated liquid, said tank having convergently disposed side walls and openings in its bottom between the lower ends of the side walls, mineral collecting plates arranged in spaced relation to the upper surfaces of said side walls, steam pipe coils arranged between said plates and the side walls of said tank, a common supply pipe connected to said coils whereby the plates may be heated to dry out the concentrates settling thereon, a plurality of valved outlets for the tank and a common discharge pipe connected thereto, the concentrates gravitating downwardly upon the collecting plates through the openings in the bottom of the tank, and a conveyer arranged beneath said openings to receive the concentrates.

6. In an ore concentrator, a tank to receive the mineral impregnated liquid, a plurality of filters arranged in each of the side walls of said tank, said filters each consisting of independently removable filtering members, water receiving chambers on the side walls of the tank exteriorly thereof, a waste pipe connected to each of said chambers, and mineral collecting means in the tank.

7. In an ore concentrator, a tank to receive the mineral impregnated liquid, a plurality of filters arranged in each of the side walls of said tank, said filters each consisting of a plurality of independently removable filtering members vertically arranged in the tank walls, the innermost filtering member having an upper imperforate portion, water receiving chambers upon the side walls of the tank, a waste pipe connected to each of said chambers, and collecting means for the mineral concentrates in the tank.

In testimony whereof I hereunto affix my signature in the presence of two witnesses.

MARION L. PORTER.

Witnesses:
OLOF W. NYBERG,
CHAS. GAGNER.